United States Patent
Pjescic

(10) Patent No.: US 11,858,478 B2
(45) Date of Patent: Jan. 2, 2024

(54) FLUID GUIDING APPARATUS FOR A WINDSCREEN WIPER

(71) Applicant: Robert Bosch GmbH, Stuttgart (DE)

(72) Inventor: Ilija Pjescic, Belgrad (RS)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/942,446

(22) Filed: Sep. 12, 2022

(65) Prior Publication Data
US 2023/0079540 A1 Mar. 16, 2023

(30) Foreign Application Priority Data

Sep. 14, 2021 (DE) ...................... 10 2021 210 130.5

(51) Int. Cl.
| | | |
|---|---|---|
| *B60S 1/48* | (2006.01) | |
| *B60S 1/34* | (2006.01) | |
| *B60S 1/52* | (2006.01) | |
| *B60S 1/38* | (2006.01) | |

(52) U.S. Cl.
CPC ............ *B60S 1/488* (2013.01); *B60S 1/3415* (2013.01); *B60S 1/3862* (2013.01); *B60S 1/487* (2013.01); *B60S 1/522* (2013.01); *B60S 1/524* (2013.01)

(58) Field of Classification Search
CPC .. B60S 1/524; B60S 1/522; B60S 1/52; B60S 1/487; B60S 1/488; B60S 1/3415; B60S 1/3862; B60S 1/482
USPC ............................ 15/250.04, 250.05, 250.07
See application file for complete search history.

(56) References Cited

U.S. PATENT DOCUMENTS

| | | | | |
|---|---|---|---|---|
| 3,427,675 A | * | 2/1969 | Tibbet ..................... | B60S 1/522 15/250.04 |
| 10,202,105 B2 | * | 2/2019 | Waible .................... | B60S 1/524 |
| 2018/0370497 A1 | * | 12/2018 | Häfner .................... | B60S 1/488 |
| 2022/0194325 A1 | * | 6/2022 | Rapp ...................... | B60S 1/524 |

FOREIGN PATENT DOCUMENTS

WO       2009/130183       * 10/2009

OTHER PUBLICATIONS

Machine translation of description portion of WO publication 2009/130183, published Oct. 2009. (Year: 2009).*

* cited by examiner

*Primary Examiner* — Gary K. Graham
(74) *Attorney, Agent, or Firm* — Michael Best & Friedrich LLP

(57) ABSTRACT

A fluid guiding apparatus for a wiper arm of a windscreen wiper, the fluid guiding apparatus having a vehicle/arm interface in order to receive windscreen washing liquid from a source, an arm/wiper blade interface which has at least two fluid channels which are provided to supply the windscreen washing liquid to a wiper blade, at least a first and a second fluid line in order to guide the windscreen washing liquid from the vehicle/arm interface the arm/wiper blade interface and to provide it to one of the fluid channels in each case, and a heating wire which is guided at least through a portion of the first fluid line and at least through a portion of the second fluid line and which is provided to heat the windscreen washing liquid. The arm/wiper blade interface has a through-opening which connects the two fluid channels to each other. The heating wire is guided through the through-opening and the through-opening is closed with a sealing element.

20 Claims, 3 Drawing Sheets

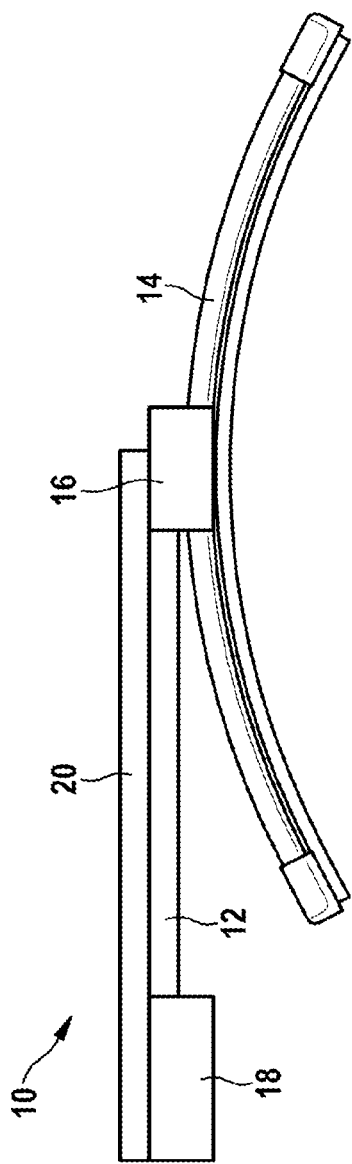
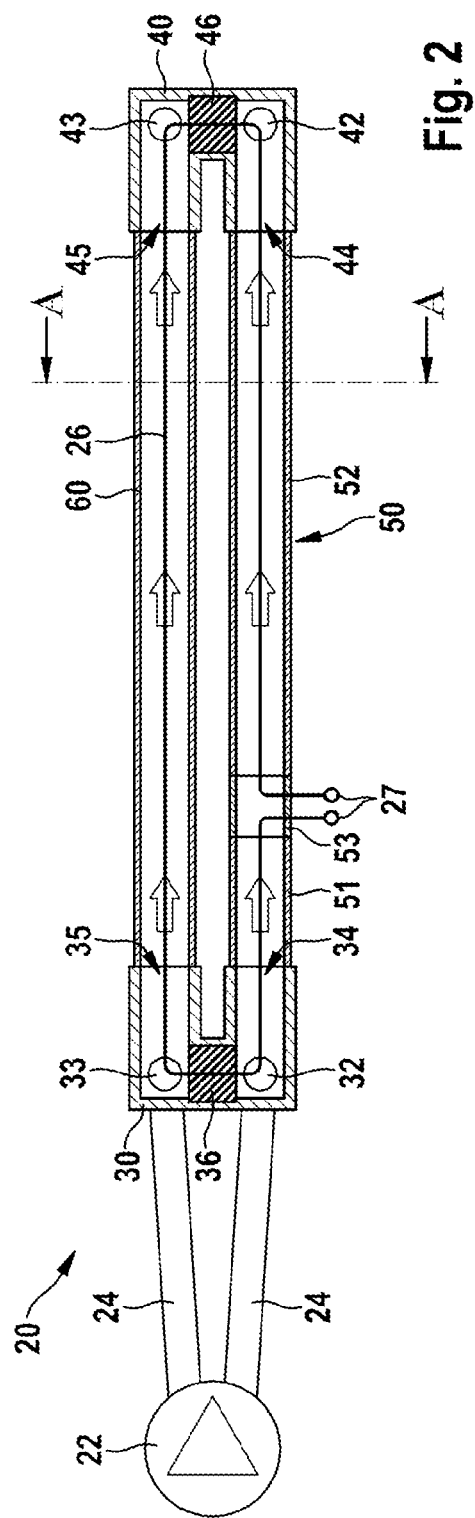

FLUID GUIDING APPARATUS FOR A WINDSCREEN WIPER

BACKGROUND

Windscreen wipers which have a wiping water line which is guided along a windscreen wiper arm are known. Such lines are often provided with heating wires in order to prevent freezing of windscreen washing liquid—particularly in winter and at low ambient temperatures—or to thaw frozen windscreen washing liquid again.

SUMMARY

The invention is based on a fluid guiding apparatus for a windscreen wiper, in particular for a wiper arm, having a vehicle/arm interface in order to receive windscreen washing liquid from a source, further having an arm/wiper blade interface which has at least two fluid channels which are provided to supply the windscreen washing liquid to a wiper blade, further having at least a first and a second fluid line in order to guide the windscreen washing liquid from the vehicle/arm interface to the arm/wiper blade interface and to provide it to one of the fluid channels in each case, and having a heating wire which is guided at least through a portion of the first fluid line and at least through a portion of the second fluid line and which is provided to heat the windscreen washing liquid.

It is proposed that the arm/wiper blade interface have a through-opening which connects the two fluid channels to each other, wherein the heating wire is guided through the through-opening and wherein the through-opening is closed with a sealing element.

A windscreen wiper is provided, for example, to free a window, in particular a windscreen or a rear windscreen of a vehicle, in particular a motor vehicle, aircraft and/or boat/ship, advantageously a passenger vehicle or lorry, from water, rain and/or dirt. For example, the windscreen wiper is provided to be connected to a windscreen wiper system of the vehicle, in particular at least one wiper motor which is provided to cause the windscreen wiper to carry out a wiping movement, in particular a pivot movement. The windscreen wiper may have a wiper blade. The wiper blade may have a wiper strip, in particular a wiper rubber, and/or a retention unit for such a wiper strip, wherein the wiper strip is provided to be in direct contact with the window pane. The windscreen wiper may further have a wiper arm which is provided to secure the wiper blade to the vehicle in particular to the windscreen wiper system of the vehicle.

The source is, for example, formed by a pump which conveys the windscreen washing liquid from a storage container and which provides it to the vehicle/arm interface. Alternatively, the source could be formed simply by a storage container, for example, a tank which is acted on with compressed air or by a tank which is supported at a specific height above the fluid line apparatus (that is to say, driven by gravitational force).

The vehicle/arm interface is, for example, formed by a substantially rigid component. In particular, the vehicle/arm interface is formed by a plastics material, in particular a thermosetting plastics material. The vehicle/arm interface has, for example, at least two inlet openings which are provided to be connected to the source, in particular by means of at least one fluid supply line, for example, a hose. The fluid supply line may in this instance be guided to significant components inside the vehicle, in particular behind at least one trim, for example, beneath an engine bonnet. The vehicle/arm interface has, for example, at least two outlet openings which are provided to be connected in each case to different lines of the first and second lines, for example, at least in a positive-locking and/or materially engaging manner. Advantageously, the vehicle/arm interface has at least two fluid channels which are each provided to connect one of the inlet openings to one of the outlet openings. Advantageously, the fluid channels of the vehicle/arm interface are guided/arranged at least substantially in a parallel manner.

The arm/wiper blade interface is, for example, formed by a substantially rigid component. In particular, the arm/wiper blade interface is formed by a plastics material, in particular a thermosetting plastics material. The wiper blade has, for example, at least one nozzle which is provided to spray the windscreen washing liquid onto a window pane. The arm/wiper blade interface has, for example, at least two inlet openings which are provided to be connected to different lines of the first and second fluid lines, for example, at least in a positive-locking and/or materially engaging manner. The arm/wiper blade interface has in particular at least one outlet opening which is provided to be connected to the nozzle, for example, by means of at least one nozzle supply line. The fluid channels of the arm/wiper blade interface are, for example, each provided to connect one of the inlet openings to one of the outlet openings. Advantageously, the fluid channels of the arm/wiper blade interface are guided/arranged at least substantially in a parallel manner.

The first fluid line and the second fluid line are in each case, for example, in the form of pipes, in particular a hose. The first fluid line may be formed partially or completely from a flexible, in particular bendable and/or formable material, in particular a composite material and/or a rubber. The second fluid line may be formed partially or completely from a flexible, in particular bendable and/or formable material, in particular a composite material and/or a rubber. In particular, a material of the first fluid line and/or the second fluid line differs from a material of the vehicle/arm interface and/or the arm/wiper blade interface. The first fluid line and the second fluid line preferably each have an at least substantially round cross section. The first fluid line and the second fluid line are, for example, provided to be guided at least for the most part, in particular by at least 50%, for example, at least 80%, preferably at least 90%, with respect to a length of the first fluid line and the second fluid line along the wiper arm and/or to be secured thereto. The first fluid line and the second fluid line are advantageously guided at least substantially parallel with each other. The first fluid line advantageously connects a first of the outlet openings of the vehicle/arm interface to a first of the inlet openings of the arm/wiper blade interface. The second fluid line advantageously connects a second of the outlet openings of the vehicle/arm interface to a second of the inlet openings of the arm/wiper blade interface.

The fact that two elements of the fluid guiding apparatus are "coupled" or "connected" to each other is, for example, intended to be understood to mean that they are connected to each other at least in technical flow terms, preferably also mechanically. Preferably, such a coupling/connection is constructed at least substantially in a fluid-tight manner.

The heating wire is in the form, for example, of a resistance heating member. Advantageously, the heating wire is guided at least substantially in a linear manner, in particular in a winding-free manner, and/or at least substantially parallel with a path of the first fluid line or the second fluid line within the respective fluid line since in particular a uniform heating can thereby be achieved. Alternatively, it is conceivable for the heating wire to be guided in a helical manner in the respective fluid line. The heating wire may have an insulation layer which protects the heating wire from corrosion and/or which prevents a transfer of electricity into the windscreen washing liquid, which may, for example, lead to a short-circuit. Preferably, the heating wire has an at least substantially constant conductivity over the entire length thereof. The heating wire may be provided to prevent a freezing of the windscreen washing liquid inside the first and second fluid lines—particularly in winter and/or at low ambient temperatures—and/or to thaw frozen windscreen washing liquid inside the first and second fluid lines again.

It is further proposed that the heating wire comprise a single continuous wire. A uniform heating can thereby, for example, be achieved. Alternatively, it is possible for the heating wire to comprise a plurality of strands which are guided in a parallel manner or for the heating wire to be composed along the length from a plurality of pieces which are connected to each other by means of positive-locking, non-positive-locking and/or materially engaging connection.

The through-opening is, for example, formed in a direction which is transverse, in particular perpendicular, to a transport direction of the fluid channels. In particular, the through-opening connects the two fluid channels directly, that is to say, for example, in an at least substantially straight line. Preferably, the through-opening connects the two fluid channels over the shortest path.

The sealing element is advantageously formed from a polymer, in particular a rubber or a silicone. Alternatively, the sealing element may be formed by an adhesive mass which in particular hardens to form a hard polymer, for example, a thermosetting plastics material. For example, the sealing element is provided to retain the heating wire at least substantially centrally in the through-opening. In particular, the sealing element has at least one sealing lip which is provided to press against the arm/wiper blade interface. In particular, the sealing element is provided to circumferentially enclose the heating wire, for example, by means of at least one sealing lip.

The term "provided" is intended, for example, to be understood to mean specially equipped, formed and/or configured. The fact that an element is provided for a specific function should, for example, be understood to mean that the function is performed in at least one state, in particular in at least one fully mounted state.

As a result of the configuration according to the invention of the fluid guiding apparatus, a space saving construction can in particular be achieved. In particular, a construction with few components can be achieved.

According to other embodiments, it is proposed that the arm/wiper blade interface have an angled form so that a fluid transport direction in the respective fluid channel is changed at at least one bend. For example, the fluid transport direction is changed at the bend through 90°, wherein other angles, in particular in the range between 30° and 90°, are also conceivable. The bend is, for example, in the form of a sharp bend with sharp corners/angles. Alternatively, the bend is formed in a curved manner as a soft bend. For example, a "bend" is intended to be understood to be a location of the most powerful curvature of the fluid transport direction. It is thereby possible in particular to achieve a small structural shape since, although the fluid lines are bendable, they often have large bending radii.

It is further proposed that the through-opening of the arm/wiper blade interface be arranged in the region of the bend, in particular directly on the bend. It is thereby possible in particular to achieve a simple assembly. Furthermore, this may enable a central guiding of the heating wire in the fluid lines.

It is further proposed that the through-opening of the arm/wiper blade interface be arranged centrally or at least substantially centrally with respect to the fluid channels of the arm/wiper blade interface. A reliable redirection of the heating wire can thereby be achieved. It is further possible for only desired/selective regions to be heated, particularly since a heating action also expands up to a specific distance from the heating wire.

According to other embodiments, the arm/wiper blade interface may be formed from at least two portions which together bound the through-opening. For example, at least a first of the portions forms a base member. For example, the base member has a recess which exposes at least the through-opening in an outward direction. In particular, the recess also partially exposes the fluid channels. In particular, a second of the portions forms a closure which closes the base member in the region of the through-opening. The two portions are preferably connected to each other by means of a positive-locking connection and/or by means of a materially engaging connection in order to form the through-opening. Preferably, the two portions are connected to each other by means of ultrasonic welding, alternatively by means of an adhesive. For example, a simple assembly/production can be achieved.

Furthermore, the vehicle/arm interface and the arm/wiper blade interface may have the same shape, in particular be constructed in an identical manner. In particular, the interfaces are produced by means of the same production method. It is thereby possible in particular to achieve a cost saving and/or simpler assembly.

In other embodiments, at least the first fluid line is formed by a first portion, a second portion and an intermediate element which is arranged between the first portion and the second portion, wherein ends of the heating wire on the intermediate element are guided out of the first fluid line, in particular through an outlet. The portions of the first fluid line are in the form, for example, of a pipe, in particular a hose. At least the first and second portions of the fluid line may be formed from a flexible, in particular bendable and/or formable material, in particular a composite material and/or a rubber. In particular, a material of the first and second portions of the fluid line differs from a material of the vehicle/arm interface and/or the arm/wiper blade interface. The intermediate element may be formed from a different material from the first and second portions of the first fluid line. The intermediate element may be formed from the same material as the vehicle/arm interface and/or the arm/wiper blade interface. The intermediate element may have an inlet opening in order to be connected to the first portion of the first fluid line. The intermediate element may have an outlet opening in order to be connected to the second portion of the first fluid line. Alternatively, the intermediate element may be formed integrally with the first and/or the second portion. In particular, the intermediate element may be formed from a connection seam/weld seam between the first portion and the second portion. The intermediate element may be arranged closer to the vehicle/arm interface than to the arm/wiper blade interface. In this manner, low cable lengths for a connection from the intermediate element to the vehicle can be achieved. Furthermore, the intermediate element may have an electrical interface in order to be connected to a plug connector. For example, the electrical interface may have contacts, advantageously plug contacts, alternatively sliding contacts, which are provided to be connected to contacts of a vehicle interface in order to connect the heating wire and/or the temperature sensor to a vehicle electronic system. In this manner, a simple assembly can be achieved.

The heating wire may be connected at the outlet to a supply line or be provided to be connected to a supply line which has a significantly higher conductivity than the heating wire and which is provided to connect the heating wire to an electronic supply system. In particular, the outlet is provided with a sealing agent, in particular silicone or an adhesive, in order to prevent the discharge of windscreen washing liquid. Alternatively, there may be provision for the heating wire per se to be guided through the outlet and to be provided to be coupled remotely from the intermediate element to a supply line to an electronic supply system.

As a result of such a configuration, a simple construction can in particular be achieved.

According to alternative embodiments, the second fluid line may also have an intermediate element, wherein an end of the heating wire on the intermediate element of the second fluid line is guided out of the second fluid line and another end of the heating wire on the intermediate element of the first fluid line is guided out of the first fluid line.

Alternatively, at least one end, in particular both ends, of the heating wire can be guided outward through one or more outlets which are formed in the vehicle/arm interface.

It is further proposed that the heating wire be guided precisely once through the first and second fluid lines, the vehicle/arm interface and the arm/wiper blade interface. For example, the heating wire leads from the intermediate element through the second portion to the arm/wiper blade interface, from the arm/wiper blade interface through the second fluid line to the vehicle/arm interface and from the vehicle/arm interface through the first portion back to the intermediate element. Alternatively, the heating wire leads, for example, from the vehicle/arm interface through the first fluid line to the arm/wiper blade interface and from the arm/wiper blade interface through the second fluid line back to the vehicle/arm interface.

In this manner, a reliable heating of the windscreen washing liquid can be achieved. A uniform heating power distribution can also be achieved. Furthermore, a simple construction can be achieved.

Alternatively, it is possible for the heating wire to be guided more than once, for example, twice or three times, through the first and second fluid lines, the vehicle/arm interface and the arm/wiper blade interface. In an embodiment having a second intermediate element in the second fluid line, it is also possible for the heating wire not to be guided the same number of times through all the regions of the first and second fluid line and/or the vehicle/arm interface and the arm/wiper blade interface, which may lead to specific regions being selectively more powerfully heated than others.

A wiper arm having a fluid guiding apparatus as described above is further proposed.

A windscreen wiper having a fluid guiding apparatus as described above is further proposed.

A method for producing an above-described fluid guiding apparatus is also proposed.

The fluid guiding apparatus according to the invention, the windscreen wiper according to the invention and/or the method according to the invention should not in this instance be limited to the above-described application and embodiment. In particular, the fluid guiding apparatus according to the invention, the windscreen wiper according to the invention and/or the method according to the invention in order to perform a function described herein may have a number of individual method steps, elements, components and units different from the number mentioned herein. In addition, in the value ranges set out in this disclosure, values within the limits mentioned should also be considered to be disclosed and freely applicable.

BRIEF DESCRIPTION OF THE DRAWINGS

Other advantages will be appreciated from the following description of the drawings. In the drawings, one embodiment of the invention is illustrated. The drawings, the description and the claims contain numerous features in combination. The person skilled in the art will advantageously also consider the features individually and combine them to form advantageous additional embodiments.

In the drawings:

FIG. 1 shows a windscreen wiper according to the invention having a fluid guiding apparatus according to the invention as a schematic illustration, FIG. 2 shows a washing water transport system having the fluid guiding apparatus as a schematic illustration.

DETAILED DESCRIPTION

Figure 3:
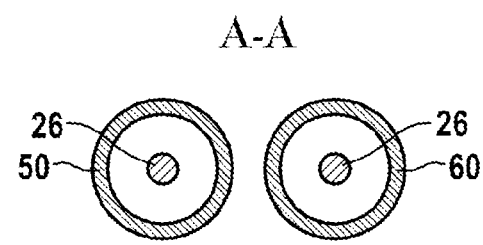
FIG. 3 shows a cross sectional view along the line of section A-A in FIG. 2 through fluid lines of the fluid guiding apparatus as a schematic view.
Figure 4:
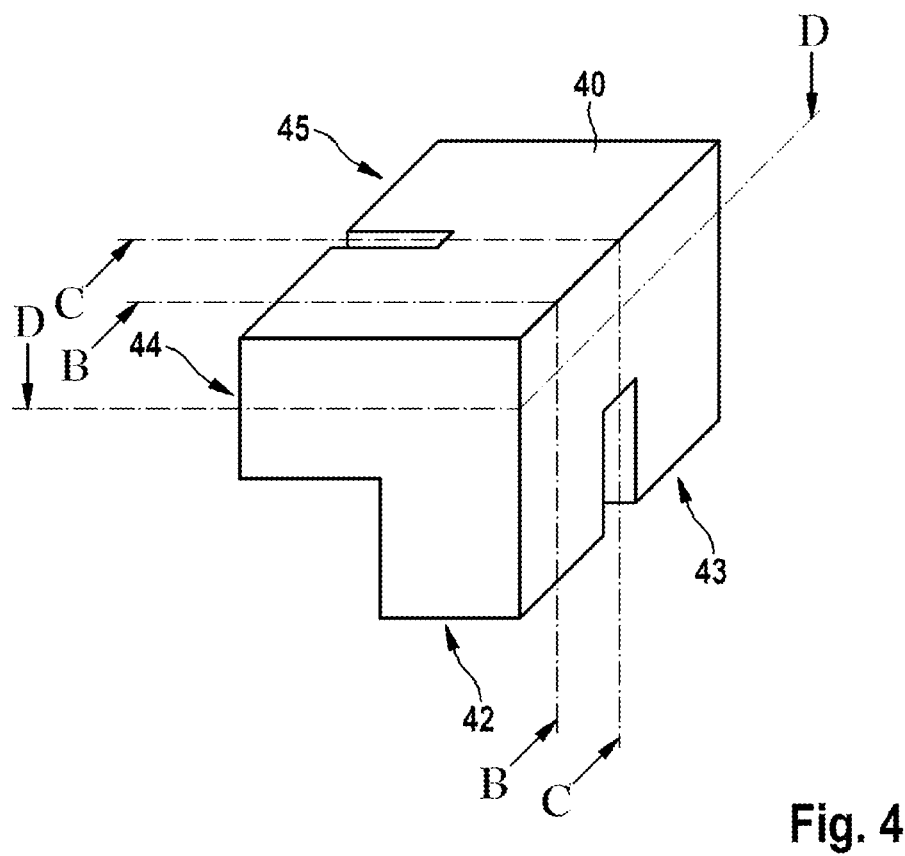
FIG. 4 shows an arm/wiper blade interface of the fluid guiding apparatus as a schematic, perspective illustration.
Figure 5:
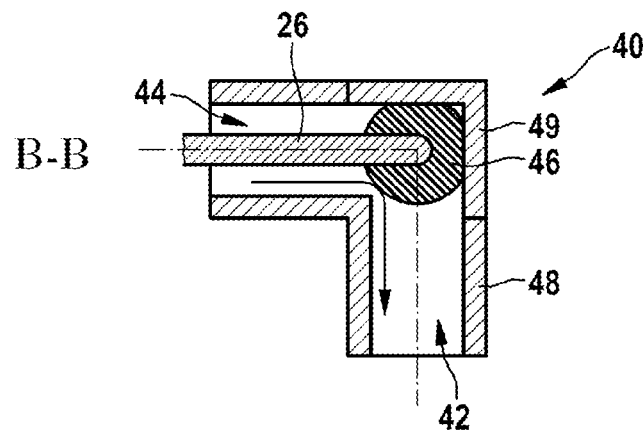
FIG. 5 shows a sectioned view of the arm/wiper blade interface according to FIG. 4 along the line of section B-B as a schematic illustration.
Figure 6:
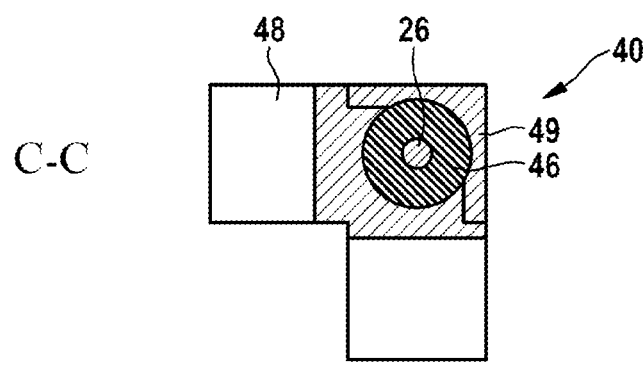
FIG. 6 shows a sectioned view of the arm/wiper blade interface according to FIG. 4 along the line of section C-C as a schematic illustration.
Figure 7:
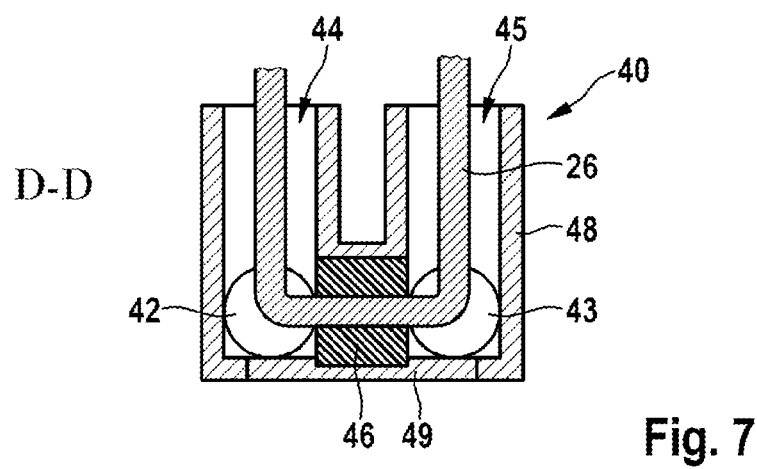
FIG. 7 shows a sectioned view of the arm/wiper blade interface according to FIG. 4 along the line of section D-D as a schematic illustration.

FIG. 1 shows a windscreen wiper 10. The windscreen wiper 10 has a wiper arm 12. The windscreen wiper 10 has a wiper blade 14. The wiper arm 12 has a wiper blade adapter 16 which is provided to connect the wiper blade 14 to the wiper arm 12. The wiper arm 12 further has a securing portion 18 which is provided to connect the wiper arm 12 to a vehicle (not illustrated in greater detail). The windscreen wiper 10 further has a fluid guiding apparatus 20 which is provided to transport windscreen washing liquid along the wiper arm 12. The fluid guiding apparatus 20 is guided along the wiper arm 12. The fluid guiding apparatus 20 is secured to the wiper arm 12 at least at one securing location.

The fluid guiding apparatus 20 has a vehicle/arm interface 30 in order to receive windscreen washing liquid from a source 22. The source 22 is in the form of a pump which draws windscreen washing liquid from a storage container/tank (not illustrated in greater detail). The source 22 provides the windscreen washing liquid to the vehicle/arm interface 30 by means of supply lines 24.

The vehicle/arm interface 30 can be provided to be mounted directly on the wiper arm 12 or on the vehicle.

The vehicle/arm interface 30 has an inlet opening 32. The vehicle/arm interface 30 has an outlet opening 34. A supply line 24 is coupled at the inlet opening 32 to the vehicle/arm interface 30. Inside the vehicle/arm interface 30 there is provided a fluid channel which connects the inlet opening 32 to the outlet opening 34.

The vehicle/arm interface 30 has another inlet opening 33. The vehicle/arm interface 30 has another outlet opening 35. Another supply line 24 is coupled at the additional inlet opening 33 to the vehicle/arm interface 30. Inside the vehicle/arm interface 30 there is provided an additional fluid channel which connects the additional inlet opening 33 to the additional outlet opening 35.

The fluid guiding apparatus 20 has an arm/wiper blade interface 40 in order to supply the windscreen washing liquid to the wiper blade 14. The arm/wiper blade interface 40 may be provided to be mounted directly on the wiper arm 12 or the wiper blade 14.

The arm/wiper blade interface 40 has an inlet opening 44. The arm/wiper blade interface 40 has an outlet opening 42. Inside the arm/wiper blade interface 40 there is provided a fluid channel which connects the inlet opening 44 to the outlet opening 42. The outlet opening 42 is provided to provide the windscreen washing liquid to the wiper blade 14.

The arm/wiper blade interface 40 has another inlet opening 45. The arm/wiper blade interface 40 has another outlet opening 43. Inside the arm/wiper blade interface 40 there is provided another fluid channel which connects the additional inlet opening 45 to the additional outlet opening 43. The additional outlet opening 43 is provided to provide the windscreen washing liquid to the wiper blade 14.

The fluid guiding apparatus 20 has a first fluid line 50 and a second fluid line 60 in order to guide the windscreen washing liquid from the vehicle/arm interface 30 to the arm/wiper blade interface 40 and in each case to provide it to one of the fluid channels of the arm/wiper blade interface 40.

The fluid guiding apparatus 20 further has a heating wire 26 which is guided through the first and second fluid lines 50, 60 and is provided to heat the windscreen washing liquid. The heating wire 26 is movably guided inside the first and second fluid line 50, 60 (cf. FIG. 3).

The first fluid line 50 is formed by a first portion 51, a second portion 52 and an intermediate element 53 which is arranged between the first portion 51 and the second portion 52, wherein ends 27 of the heating wire 26 on the intermediate element 53 are guided out of the first fluid line 50. The intermediate element 53 is arranged closer to the vehicle/arm interface 30 than to the arm/wiper blade interface 40. The intermediate element 53 may be arranged with a spacing of only a few centimeters from, for example, in the direct vicinity of, the vehicle/arm interface 30. The first portion 51 may have a length of a few centimeters, in particular up to a maximum of 10 centimeters.

The second fluid line 60 is constructed in an integral manner. The heating wire 26 is guided through the second fluid line 60.

The outlet opening 34 of the vehicle/arm interface 30 is coupled to a first end of the first fluid line 50. The outlet opening 34 of the vehicle arm interface 30 is coupled to the first portion 51 of the first fluid line 50. The additional outlet opening 35 of the vehicle/arm interface 30 is coupled to a first end of the second fluid line 60. A second end of the first fluid line 50 is coupled to the inlet opening 44 of the arm/wiper blade interface 40. The second portion 52 is coupled to the inlet opening 44 of the arm/wiper blade interface 40. A second end of the second fluid line 60 is coupled to the additional inlet opening 45 of the arm/wiper blade interface 40.

At least in one embodiment in which at least one of the interfaces 30, 40 is not secured to the wiper arm 12, the first fluid line 50 is at least at one securing location, advantageously at least at two securing locations, directly connected to the wiper arm 12. Alternatively, in an embodiment in which both interfaces 30, 40 are secured directly to the wiper arm 12, a securing of the first fluid line 50 to the wiper arm 12 can be dispensed with.

The heating wire 26 is guided precisely once through the first and second fluid lines 50, 60, the vehicle/arm interface 30 and the arm/wiper blade interface 40. The heating wire 26 starts and ends at the intermediate element 53. The heating wire 26 comprises a single continuous wire. The heating wire 26 has an insulation layer. The insulation layer may comprise a lacquer coating.

In FIGS. 4 to 7, the arm/wiper blade interface 40 is shown in detail in various views. The arm/wiper blade interface 40 has a through-opening which connects the two fluid channels of the arm/wiper blade interface 40 to each other. The heating wire 26 is guided through the through-opening. The through-opening is closed with a sealing element 46.

The arm/wiper blade interface 40 has an angled form so that a fluid transport direction in the respective fluid channel of the arm/wiper blade interface 40 is changed at at least one bend. A fluid transport direction is in this case changed by approximately a right angle.

The through-opening of the arm/wiper blade interface 40 is arranged in the region of the bend. The through-opening of the arm/wiper blade interface 40 is arranged centrally or at least substantially centrally with respect to a length of the fluid channels of the arm/wiper blade interface 40.

The arm/wiper blade interface 40 is formed from two portions 48, 49 which together bound the through-opening. A first portion 48 is in the form of a base member. The first portion 48 has the fluid channels of the arm/wiper blade interface 40. The first portion 48 has the inlet openings 44, 45 of the arm/wiper blade interface 40. The first portion 48 has the outlet openings 42, 43 of the arm/wiper blade interface 40. The first portion 48 has a recess which exposes the through-opening between the two fluid channels of the arm/wiper blade interface 40 in an outward direction. The recess is formed at the bend.

During assembly/production, the heating wire 26 is guided through both of the inlet openings 44, 45. Furthermore, the heating wire 26 is guided/inserted through the sealing element 46, in particular through a fine hole, for example, at the center thereof, until at least one end 27 of the heating wire 26 has not yet been guided through an inlet opening 44, 45. Alternatively, the sealing element 46 may have a slot through which the heating wire 26 can be placed in the sealing element, even after both ends 27 of the heating wire 26 have been guided through the inlet openings 44, 45.

The sealing element 46 is subsequently placed in the through-opening.

The second portion 49 of the arm/wiper blade interface 40 forms a closure cap for the recess in the first portion 48. The second portion 49 is constructed in an angled (L-shaped) manner. By attaching the second portion 49 to the first portion 48, the through-opening is closed in an outward direction. As a result of the second portion 49 being pressed against the first portion 48, the sealing element 46 becomes deformed so that it completely fills the through-opening and reliably closes it. The two portions 48, 49 are now connected to each other by means of ultrasonic welding.

Furthermore, alternative embodiments are conceivable, according to which the arm/interface is constructed in an integral manner. In particular, in this instance, the sealing element can be introduced together with the heating wire through one of the inlet openings and can then as a result of a corresponding configuration engage in the through-opening. It is also possible for the sealing element to be formed from an injected adhesive mass only after the heating wire has been guided through the through-opening.

The vehicle/arm interface 30 and the arm/wiper blade interface 40 have the same shape. The vehicle/arm interface 30 and the arm/wiper blade interface 40 are constructed in an identical manner. The vehicle/arm interface 30 and the arm/wiper blade interface 40 are used in the inverted fluid flow direction. Outlet openings 34, 35 of the vehicle/arm interface 30 correspond to inlet openings 44, 45 of the arm/wiper blade interface 40. Inlet openings 32, 33 of the vehicle/arm interface 30 correspond to outlet openings 42, 43 of the arm/wiper blade interface 40.

The vehicle/arm interface 30 has a through-opening which connects the two fluid channels of the vehicle/arm interface 30 to each other. The heating wire 26 is guided through the through-opening. The through-opening is closed with a sealing element 36.

The vehicle/arm interface 30 has an angled form so that a fluid transport direction in the respective fluid channel of the vehicle arm/interface 30 is changed at least at one bend. A fluid transport direction is in this instance changed by substantially a right angle.

The through-opening of the vehicle/arm interface 30 is arranged in the region of the bend. The through-opening of the vehicle/arm interface 30 is arranged centrally or at least substantially centrally with respect to a length of the fluid channels of the vehicle/arm interface 30.

The vehicle/arm interface 30 is formed from two portions which together bound the through-opening. A first portion is in the form of a base member. The first portion has the fluid channels of the vehicle/arm interface 30. The first portion has the inlet openings 32, 33 of the vehicle/arm interface 30. The first portion has the outlet openings 34, 35 of the vehicle/arm interface 30. The first portion has a recess which exposes the through-opening between the two fluid channels of the vehicle/arm interface 30 in an outward direction. The recess is formed at the bend.

During assembly/production, the heating wire 26 is guided through both of the outlet openings 34, 35. Furthermore, the heating wire 26 is guided/inserted through the sealing element 36, in particular through a fine hole, for example, at the center thereof, until at least one end 27 of the heating wire 26 has not yet been guided through an outlet opening 34, 35. Alternatively, the sealing element 36 may have a slot through which the heating wire 26 can be placed in the sealing element, even after both ends 27 of the heating wire 26 have been guided through the outlet openings 34, 35.

The sealing element 36 is subsequently placed in the through-opening.

The second portion of the vehicle/arm interface 30 forms a closure cap for the recess in the first portion. The second portion is constructed in an angled (L-shaped) manner. By attaching the second portion to the first portion, the through-opening is closed in an outward direction. As a result of the second portion being pressed against the first portion, the sealing element 36 becomes deformed so that it completely fills the through-opening and reliably closes it. The two portions are now connected to each other by means of ultrasonic welding.

What is claimed is:

1. A fluid guiding apparatus for a wiper arm (12) of a windscreen wiper (10), the fluid guiding apparatus comprising:
    a vehicle/arm interface (30) in order to receive windscreen washing liquid from a source (22),
    an arm/wiper blade interface (40) which has at least two fluid channels which are provided to supply the windscreen washing liquid to a wiper blade (14),
    at least a first and a second fluid line (50, 60) in order to guide the windscreen washing liquid from the vehicle/arm interface (30) to the arm/wiper blade interface (40) and to provide it to one of the fluid channels in each case, and
    a heating wire (26) which is guided at least through a portion of the first fluid line (50) and at least through a portion of the second fluid line (60) and which is provided to heat the windscreen washing liquid,
    wherein the arm/wiper blade interface (40) has a through-opening which connects the two fluid channels to each other, wherein the heating wire (26) is guided through the through-opening and wherein the through-opening is closed with a sealing element (46),
    wherein the arm/wiper blade interface (40) has an angled form so that a fluid transport direction in the respective fluid channel is changed at at least one bend.

2. The fluid guiding apparatus according to claim 1, wherein the through-opening of the arm/wiper blade interface (40) is arranged in the region of the bend.

3. The fluid guiding apparatus according to claim 1, wherein the through-opening of the arm/wiper blade interface (40) is arranged centrally or at least substantially centrally with respect to a length of the fluid channels.

4. The fluid guiding apparatus according to claim 1, wherein the arm/wiper blade interface (40) is formed from at least two portions (48, 49) which together bound the through-opening.

5. The fluid guiding apparatus according to claim 1, wherein the vehicle/arm interface (30) and the arm/wiper blade interface (40) have the same shape.

6. The fluid guiding apparatus according to claim 5, wherein the vehicle/arm interface (30) and the arm/wiper blade interface (40) are constructed in an identical manner.

7. The fluid guiding apparatus according to claim 1, wherein at least the first fluid line (50) is formed by a first portion (51), a second portion (52) and an intermediate element (53) which is arranged between the first portion (51) and the second portion (52), wherein ends (27) of the heating wire (26) on the intermediate element (53) are guided out of the first fluid line (50).

8. The fluid guiding apparatus according to claim 1, wherein the heating wire (26) is guided precisely once through the first and second fluid lines (50, 60), the vehicle/arm interface (30) and the arm/wiper blade interface (40).

9. A windscreen wiper having a fluid guiding apparatus according to claim 1.

10. A fluid guiding apparatus for a wiper arm (12) of a windscreen wiper (10), the fluid guiding apparatus comprising:
    a vehicle/arm interface (30) in order to receive windscreen washing liquid from a source (22),
    an arm/wiper blade interface (40) which has at least two fluid channels which are provided to supply the windscreen washing liquid to a wiper blade (14),
    at least a first and a second fluid line (50, 60) in order to guide the windscreen washing liquid from the vehicle/arm interface (30) to the arm/wiper blade interface (40) and to provide it to one of the fluid channels in each case, and
    a heating wire (26) which is guided at least through a portion of the first fluid line (50) and at least through a portion of the second fluid line (60) and which is provided to heat the windscreen washing liquid, wherein the arm/wiper blade interface (40) has a through-opening which connects the two fluid channels to each other, wherein the heating wire (26) is guided through the through-opening and wherein the through-opening is closed with a sealing element (46), wherein the through-opening of the arm/wiper blade interface (40) is arranged centrally or at least substantially centrally with respect to a length of the fluid channels.

11. The fluid guiding apparatus according to claim 10, wherein the arm/wiper blade interface (40) is formed from at least two portions (48, 49) which together bound the through-opening.

12. The fluid guiding apparatus according to claim 10, wherein the vehicle/arm interface (30) and the arm/wiper blade interface (40) have the same shape.

13. The fluid guiding apparatus according to claim 12, wherein the vehicle/arm interface (30) and the arm/wiper blade interface (40) are constructed in an identical manner.

14. The fluid guiding apparatus according to claim 10, wherein at least the first fluid line (50) is formed by a first portion (51), a second portion (52) and an intermediate element (53) which is arranged between the first portion (51) and the second portion (52), wherein ends (27) of the heating wire (26) on the intermediate element (53) are guided out of the first fluid line (50).

15. The fluid guiding apparatus according to claim 10, wherein the heating wire (26) is guided precisely once through the first and second fluid lines (50, 60), the vehicle/arm interface (30) and the arm/wiper blade interface (40).

16. A fluid guiding apparatus for a wiper arm (12) of a windscreen wiper (10), the fluid guiding apparatus comprising:
- a vehicle/arm interface (30) in order to receive windscreen washing liquid from a source (22),
- an arm/wiper blade interface (40) which has at least two fluid channels which are provided to supply the windscreen washing liquid to a wiper blade (14),
- at least a first and a second fluid line (50, 60) in order to guide the windscreen washing liquid from the vehicle/arm interface (30) to the arm/wiper blade interface (40) and to provide it to one of the fluid channels in each case, and
- a heating wire (26) which is guided at least through a portion of the first fluid line (50) and at least through a portion of the second fluid line (60) and which is provided to heat the windscreen washing liquid, wherein the arm/wiper blade interface (40) has a through-opening which connects the two fluid channels to each other, wherein the heating wire (26) is guided through the through-opening and wherein the through-opening is closed with a sealing element (46), wherein at least the first fluid line (50) is formed by a first portion (51), a second portion (52) and an intermediate element (53) which is arranged between the first portion (51) and the second portion (52), wherein ends (27) of the heating wire (26) on the intermediate element (53) are guided out of the first fluid line (50).

17. The fluid guiding apparatus according to claim 16, wherein the arm/wiper blade interface (40) is formed from at least two portions (48, 49) which together bound the through-opening.

18. The fluid guiding apparatus according to claim 16, wherein the vehicle/arm interface (30) and the arm/wiper blade interface (40) have the same shape.

19. The fluid guiding apparatus according to claim 18, wherein the vehicle/arm interface (30) and the arm/wiper blade interface (40) are constructed in an identical manner.

20. The fluid guiding apparatus according to claim 16, wherein the heating wire (26) is guided precisely once through the first and second fluid lines (50, 60), the vehicle/arm interface (30) and the arm/wiper blade interface (40).

* * * * *